US011234033B2

(12) United States Patent
Solow

(10) Patent No.: US 11,234,033 B2
(45) Date of Patent: Jan. 25, 2022

(54) DECENTRALIZED CONTENT DISTRIBUTION

(71) Applicant: Cisco Technology, Inc., San Jose, CA (US)

(72) Inventor: Hillel Solow, Beit Shemesh (IL)

(73) Assignee: CISCO TECHNOLOGY, INC., San Jose, CA (US)

(*) Notice: Subject to any disclaimer, the term of this patent is extended or adjusted under 35 U.S.C. 154(b) by 404 days.

(21) Appl. No.: 15/681,388

(22) Filed: Aug. 20, 2017

(65) Prior Publication Data

US 2019/0058910 A1    Feb. 21, 2019

(51) Int. Cl.
*H04N 21/25* (2011.01)
*G06F 21/10* (2013.01)
(Continued)

(52) U.S. Cl.
CPC ......... *H04N 21/2541* (2013.01); *G06F 21/10* (2013.01); *G06F 21/64* (2013.01);
(Continued)

(58) Field of Classification Search
CPC ........... H04N 21/2541; H04N 21/4627; H04N 21/4405; G06F 21/64; G06F 21/10;
(Continued)

(56) References Cited

U.S. PATENT DOCUMENTS

| 10,037,556 B2 * | 7/2018 | Raman ...................... H04L 9/00 |
| 2011/0087602 A1 * | 4/2011 | Rutman .................. G07F 17/16 |
| | | 705/52 |

(Continued)

FOREIGN PATENT DOCUMENTS

| WO | 2015024129 | 2/2015 | |
| WO | WO-2017145047 A1 * | 8/2017 | ............... H04L 9/14 |

OTHER PUBLICATIONS

"Xinwen Zhang, Katharine Chang, Huijun Xiong, Yonggang Wen, Guangyu Shi, Guoqiang Wang, Towards Name-based Trust and Security for Content-centric Network, Oct. 17-20, 2011, 2011 19th IEEE International Conference on Network Protocols" (Year: 2011).*

(Continued)

*Primary Examiner* — Neha Patel
*Assistant Examiner* — Duan Zhang
(74) *Attorney, Agent, or Firm* — Merchant & Gould P.C.

(57) ABSTRACT

In one embodiment, a computing device includes: a media player operative to at least play a content item on the computing device, a blockchain-based wallet application operative to transfer a transaction amount to a publisher wallet ID via an associated blockchain-based transaction service, a secure digital rights management (DRM) client application operative to verify the transfer of the transaction amount to said publisher wallet ID according to a public transaction ledger associated with the associated blockchain-based transaction service and upon successful verification of the transfer of the transaction amount to the publisher wallet ID at least unlock a locked version of the content item, and a processor operative to execute the media player, the blockchain-based wallet application, and the DRM client application.

20 Claims, 3 Drawing Sheets

(51) Int. Cl.
H04N 21/254 (2011.01)
H04L 9/06 (2006.01)
H04L 29/06 (2006.01)
H04L 9/32 (2006.01)
H04N 21/4405 (2011.01)
H04N 21/4627 (2011.01)
G06F 21/64 (2013.01)
G06Q 20/38 (2012.01)

(52) U.S. Cl.
CPC .......... *H04L 9/0637* (2013.01); *H04L 9/3239* (2013.01); *H04L 63/0823* (2013.01); *H04N 21/4405* (2013.01); *H04N 21/4627* (2013.01); *G06Q 20/3829* (2013.01); *H04L 63/0428* (2013.01); *H04L 2209/38* (2013.01); *H04L 2209/56* (2013.01); *H04L 2209/603* (2013.01); *H04L 2463/102* (2013.01); *H04L 2463/103* (2013.01)

(58) Field of Classification Search
CPC . H04L 9/3239; H04L 63/0823; H04L 9/0637; H04L 2463/103; H04L 2209/603; H04L 2209/38; H04L 2209/56; H04L 2463/102; H04L 63/0428; G06Q 20/3829
USPC .......................................................... 705/51
See application file for complete search history.

(56) References Cited

U.S. PATENT DOCUMENTS

| | | | | |
|---|---|---|---|---|
| 2012/0109830 | A1* | 5/2012 | Vogel | G06Q 20/384 705/75 |
| 2012/0323735 | A1* | 12/2012 | Montero | G06Q 20/385 705/26.41 |
| 2013/0151419 | A1* | 6/2013 | Hitchcock | G06Q 30/06 705/75 |
| 2014/0236767 | A1* | 8/2014 | Duggal | G06Q 20/3276 705/26.61 |
| 2016/0125371 | A1* | 5/2016 | Grassadonia | H04L 51/046 705/44 |
| 2016/0210626 | A1* | 7/2016 | Ortiz | G06Q 20/023 |
| 2016/0253651 | A1* | 9/2016 | Park | G07F 9/023 705/39 |
| 2016/0300234 | A1 | 10/2016 | Moss-Pultz et al. | |
| 2016/0321434 | A1 | 11/2016 | McCoy et al. | |
| 2016/0321650 | A1* | 11/2016 | Fedak | G06Q 20/351 |
| 2017/0048235 | A1* | 2/2017 | Lohe | G06Q 20/065 |
| 2017/0180774 | A1* | 6/2017 | Kolhi | H04N 21/2747 |
| 2017/0221029 | A1* | 8/2017 | Lund | H04W 12/04 |
| 2017/0256003 | A1* | 9/2017 | Isaacson | G06Q 20/12 |

OTHER PUBLICATIONS

"Decentralized Name-based Security for Content Distribution using Blockchains", Nikos Fotiou, Apr. 2016, 2016 IEEE Conference on Computer Communications Workshops (Year: 2016).*
Adaptive Video Streaming Over Information-Centric Networking (ICN). Internet Research Task Force (IRTF); RFC7933: Aug. 2016.
Wikipedia: Information-Centric Networking (2017) Can be found at: https://en.wikipedia.org/wiki/Information-centric_networking.
Hopf, Stefan et al.: Crypto-Property and Trustless Peer-To-Peer Transactions: Blockchain as Disruption of Property Rights and Transaction Cost Regimes? (from p. 165; 2016).
Proposal A Distributed DRM System Using ICN-OPENSSL. Can be found at: http://ieeexplore.ieee.org/document/5713444/?reload=true&tp=&arnumber=5713444.
Bright: A concept for a decentralized rights management system based on blockchain. Can be found at http://ieeexplore.ieee.org/document/7391275/.

* cited by examiner

DECENTRALIZED CONTENT DISTRIBUTION

TECHNICAL FIELD

The present disclosure generally relates to the distribution of digital content.

BACKGROUND

Content distribution over the Internet is known in the art. In a typical Internet content distribution system, a content distributor provides a licensed copy of a digital content item (e.g., a movie, video clip, audio clip, eBook, etc.). The digital content is typically encrypted and protected by a digital rights management (DRM) license; the content distributor provides a decryption key in exchange for payment. A content distribution system therefore typically employs infrastructure for at least content distribution, payment processing, DRM licensing, etc. The content provider will either operate such infrastructure internally, or will outsource some or all of the infrastructure using a platform as a service (PaaS) or application platform as a service (aPaaS) provider.

BRIEF DESCRIPTION OF THE DRAWINGS

The embodiments described herein will be understood and appreciated more fully from the following detailed description, taken in conjunction with the drawings in which.

DESCRIPTION OF EXAMPLE EMBODIMENTS

Overview

A computing device includes: a media player operative to at least play a content item on the computing device, a blockchain-based wallet application operative to transfer a transaction amount to a publisher wallet ID via an associated blockchain-based transaction service, a secure digital rights management (DRM) client application operative to verify the transfer of the transaction amount to said publisher wallet ID according to a public transaction ledger associated with the associated blockchain-based transaction service and upon successful verification of the transfer of the transaction amount to the publisher wallet ID at least unlock a locked version of the content item, and a processor operative to execute the media player, the blockchain-based wallet application, and the DRM client application.

A content publishing system is implemented on at least one computing device and includes: at least one processor, an input/output module, a digital rights management (DRM) module executable by the at least one processor and operative to wrap digital content items with license details where the license details indicate at least a requested transaction amount and a publisher wallet ID associated with a blockchain-based wallet application and to produce encrypted digital content items by encrypting the digital content items, and a content distributor application executable by the at least one processor and operative to forward the encrypted digital content items to an information centric networking (ICN) network for download to a user device, where in accordance with the license details, decryption of the encrypted digital content items is contingent on verification of the requested transaction amount being transferred to the publisher wallet ID on behalf of the user device.

Description

It will be appreciated that large scale content distributors may have an advantage when operating Internet content distribution systems such as described hereinabove. Smaller content publishers/distributors may lack the resources to provide infrastructure for content distribution, licensing, billing, etc. However, the Internet is evolving to become more information centric. An information centric networking model may lend itself to a more distributed architecture and away from larger, more centralized content delivery frameworks. Such a model may facilitate a content selling approach that enables a content publisher to distribute digital content by pushing it into the network without necessarily having to directly control licensing of the content upon purchase.

Figure 1:
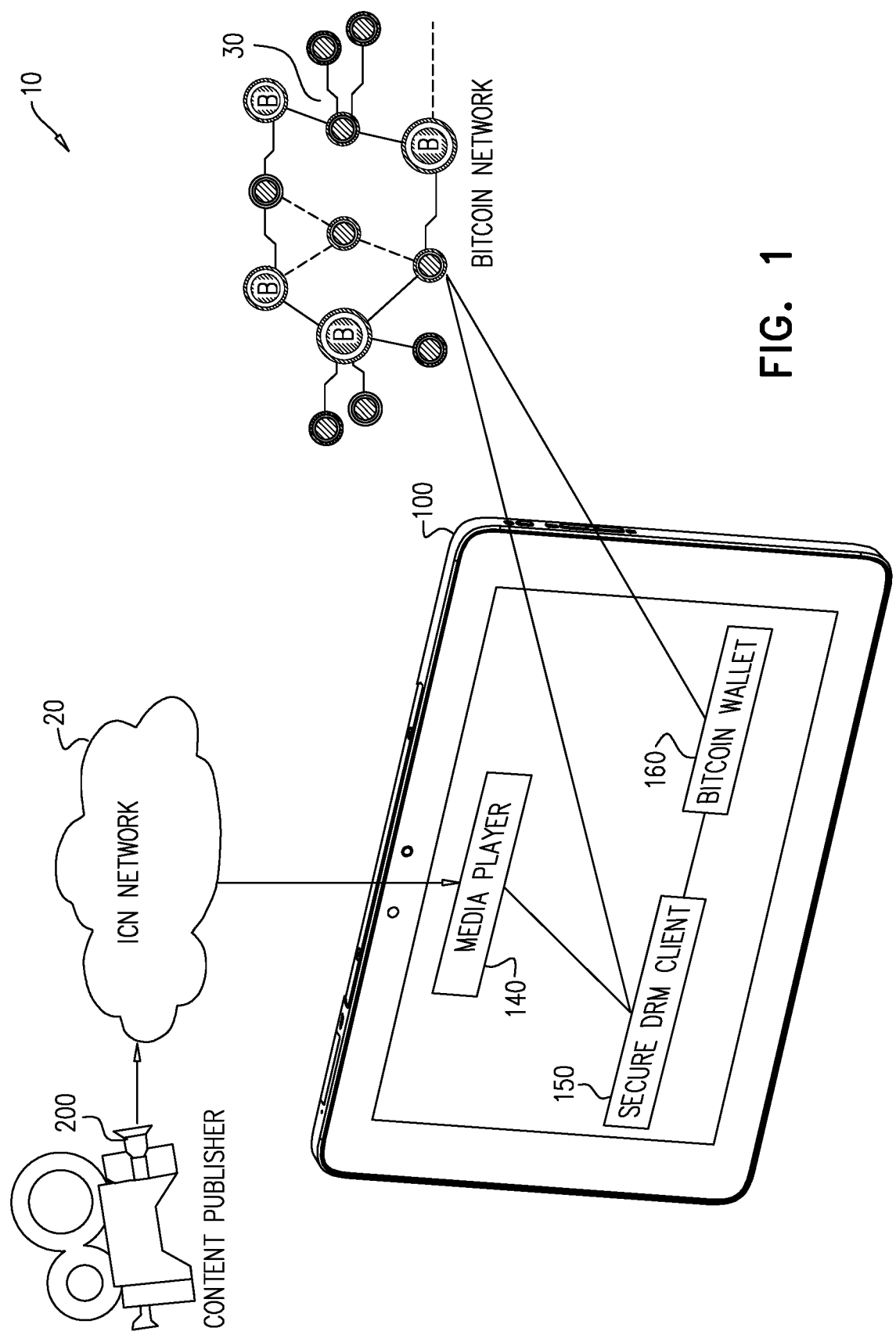
FIG. 1 is an illustration of a decentralized content distribution system, constructed and operative in accordance with embodiments described herein.

Reference is now made to FIG. 1, which is an illustration of a decentralized content distribution system 10, constructed and operative in accordance with embodiments described herein. System 10 comprises information centric networking (ICN) network 20, Bitcoin network 30, digital content player device 100 and content publisher 200.

In accordance with embodiments described herein, system 10 may employ a decentralized DRM approach to distribute digital content. A decentralized DRM approach is a DRM scheme where a user receives a content package including the terms of the license, digital content, and key material (i.e., either one or more keys, or material for generating the one or more keys). The components of the content package are wrapped together in a way that a secure DRM client is required to open them, thereby limiting access to the key material (and thus to the digital content) according to the license terms.

Accordingly, content publisher 200 may wrap a digital content item and publish it along with a license by posting it on ICN network 20. The license may include, for example, the terms of use, such as the price (i.e., the transaction amount requested for use of the digital content item), the type of uses allowed, the duration and count limitations, sharing policies, etc. The license also includes key material for decrypting the protected content. This key material may be wrapped such that only a secure DRM client can unwrap it, after having been downloaded from ICN 20 along with the wrapped digital content item. An example of such a secure DRM client is secure DRM client application 150, which is depicted in FIG. 1 on digital content player device 100. Secure DRM client application 150 may be operative to unwrap, i.e., extract, the key material according to the terms of the license, in order to enable media player 140 to render the digital content item for playing on digital content player device 100.

It will be appreciated that in a typical distribution model, the user provides, or otherwise proves, payment to the service or content provider in order to access the digital content item. For example, in a typical decentralized DRM approach the user interacts with a payment server associated with the service/content provider to effect payment for use of the digital content item. After the payment is received or proven, the payment server (or some other function associated with the service/content provider) issues a license agreement number or a token to open the digital content item. The user may similarly prove payment for an already paid for item by providing a previously received license agreement number or token, received, for example, when pre-paying for the digital content item.

In accordance with embodiments described herein, system 10 may effectively replace the functionality of a content/service provider's payment server with a public payment service, such as, for example but not limited to, Bitcoin as supported by Bitcoin network 30. It will be appreciated that the following embodiments described with respect to Bitcoin may also support the use of other blockchain-based transaction systems. For example, content publisher 200 may provide the digital content item in ICN network 20 with a secure binding for a crypto-currency along with a license that includes both a price list (i.e., requested transaction amount) as well as one or more Bitcoin "wallet IDs" that may be used to make payment via Bitcoin network 30.

It will be appreciated that a public payment service such as Bitcoin may be implemented using a blockchain scheme where the balance for a given wallet ID is determined according to its associated transaction history in a public transaction ledger. Accordingly, once a transaction has been completed using a public payment service such as Bitcoin, a record of the transaction will be made publicly available via the public transaction ledger in order to facilitate the calculation of new balances for the affected wallet IDs. The public transaction ledger is continually updated with new transactions, and replicated between transaction servers in the public payment service. Accordingly, while transaction details may be digitally signed by private keys in order to associate a transaction with its participating wallet IDs, once the transaction is completed, the transaction details may be freely viewed in the public transaction ledger.

In operation, secure DRM client application 150 may securely review the transaction history in a bitcoin public transaction ledger (in bitcoin network 30) in order to determine if the requested transaction amount has been transferred to the publisher's wallet ID (i.e., the wallet ID associated with content publisher 200) for the use of the digital content item on behalf of digital content player device 100.

Figure 2:
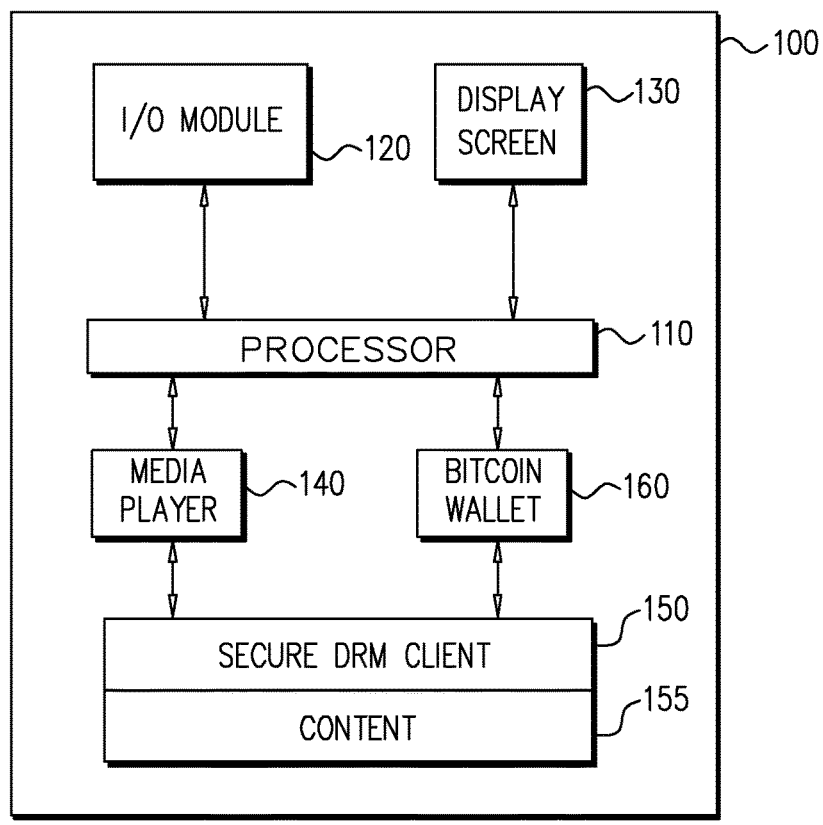
FIG. 2 is a schematic illustration of the digital content player device of FIG. 1, constructed and operative in accordance with embodiments described herein.

Reference is now made to FIG. 2 which is a schematic illustration of the digital content player device 100 of FIG. 1, constructed and operative in accordance with embodiments described herein. Digital content player device 100 may be any suitable computing device that may support the receiving and/or presentation of digital content. For example, digital content player device 100 may be implemented as a suitably configured set-top box, personal computer, computer tablet, smart-television, smartphone, and/or any suitable combination thereof.

Digital content player device 100 comprises processor 110, input/output (I/O) module 120, display screen 130 and media player 140. It will be appreciated that digital content player device 100 may comprise more than one processor 110. For example, one such processor 110 may be a special purpose processor operative to at least execute media player 140 to render and play a content 165. Processor 110 may be operative to execute instructions stored in a memory (not shown). I/O module 120 may be any suitable software or hardware component such as a universal serial bus (USB) port, disk reader, modem or transceiver that may be operative to use protocols such as are known in the art to receive content 155 from content publisher 200 (FIG. 1) over a communications network such as, for example, ICN network 20 (FIG. 1) or the Internet. Digital content player device 100 may also comprise other hardware and software components, such as are well-known in the art. It will be appreciated that the embodiments described herein may also support configurations wherein content 155 is received by a local server and forwarded to I/O module 120 over Bluetooth, WiFi or any other suitable wireless technology. Similarly, at least some or all of the other functionality attributed herein to digital content player device 100 may also be performed on such a local server. For example, the local server may be operative to perform decryption and/or video rendering on behalf of digital content player device 100. Display screen 130 may implemented as an integrated component of digital content player device 100 (e.g., a built-in screen of a computer laptop or smartphone), or as a peripheral component (e.g., an attached computer monitor). Display screen 130 may be operative to at least present the visual aspects of content 155 as rendered by media player 140 or the local server.

Media player 140 may be an application implemented in hardware or software that may be executed by processor 110 in order to at least present content 165 to a user of digital content player device 100. Secure DRM client application 150 may be an application implemented in hardware or software that may be executed by processor 110 in order to unwrap and/or decrypt content 155 for presentation by media player 140. In accordance with embodiments described herein, media player 140 may be operative to invoke secure DRM client application 150 to decrypt content 155 that would otherwise not be playable by media player 140. Bitcoin wallet 160 may be an application implemented in hardware or software that may be executed by processor 110 to at least facilitate payments via Bitcoin network 30 (FIG. 1). It will be appreciated that the use of Bitcoin wallet 160 and Bitcoin network 30 may be exemplary; the embodiments described herein may support the use of any suitable blockchain-based payment system using accessible payment records. As will be described hereinbelow with respect to FIG. 4, secure DRM client application 150 may be operative to invoke Bitcoin wallet 160 to provide payment for content 155 before use.

Figure 3:
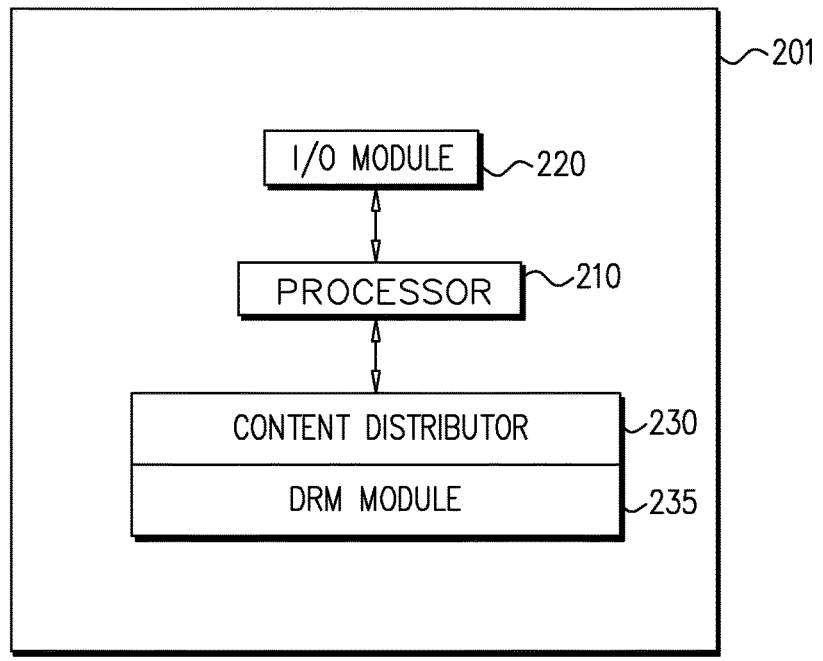
FIG. 3 is a schematic illustration of a digital content distribution server to be used by the content publisher of FIG. 1, constructed and operative in accordance with embodiments described herein.

Reference is now made to FIG. 3 which is a schematic illustration of content publisher server 201 constructed and operative in accordance with embodiments described herein. Content publisher server 201 represents an implementation of the functionality associated with content publisher 200 in FIG. 1. Content publisher server 201 may be any suitable computing device that may support the distribution of digital content by content publisher 200. For example, content publisher server 201 may be a suitably configured computer, configured either as a stand-alone computer, or within the context of a media content headend.

Content publisher server 201 comprises processor 210, Input/output (I/O) module 220, content distributor 130 and DRM module 235. Processor 210 may be operative to execute instructions stored in a memory (not shown). It will be appreciated that content publisher server 201 may comprise more than one processor 210. For example, one such processor 210 may be a special purpose processor operative to at least execute content distributor 230 to distribute digital content via I/O module 220 to a communications network such as, for example, ICN network 20 (FIG. 1) and/or the Internet. Content publisher server 201 may also comprise other hardware and software components, such as are well-known in the art.

I/O module 120 may be any suitable software or hardware component such as a universal serial bus (USB) port, disk reader, modem or transceiver that may be operative to use protocols such as are known in the art to provide communications to a communications network such as, for example, ICN network 20 (FIG. 1) or the Internet.

Content distributor 230 may be an application implemented in hardware or software that may be executed by processor 210 in order to at least distribute digital content (e.g. content 155 as depicted in FIG. 2) via I/O module 220 for use by users of devices such as digital content player device 100 (FIG. 1). DRM module 235 may be an application implemented in hardware or software that may be executed by processor 110 in order to wrap and/or encrypt the digital content prior to distribution. As discussed with respect to content publisher 200 in FIG. 1, DRM module 235 may be operative to securely bind one or more digital content items along with a license that includes both a price list (i.e., requested transaction amount) and one or more Bitcoin "wallet IDs" that may be used to make payment via Bitcoin network 30. It will be appreciated that the ICN protocol supports name-based routing, such that once the content is published to ICN network 20, it may be physically copied to multiple locations, where each copy is accessible using the same routing name. Content published to ICN network 20 may therefore be accessible to users without having to connect to a specific IP address associated with content publisher 200 or a specific distributor on behalf of content publisher 200.

Figure 4:
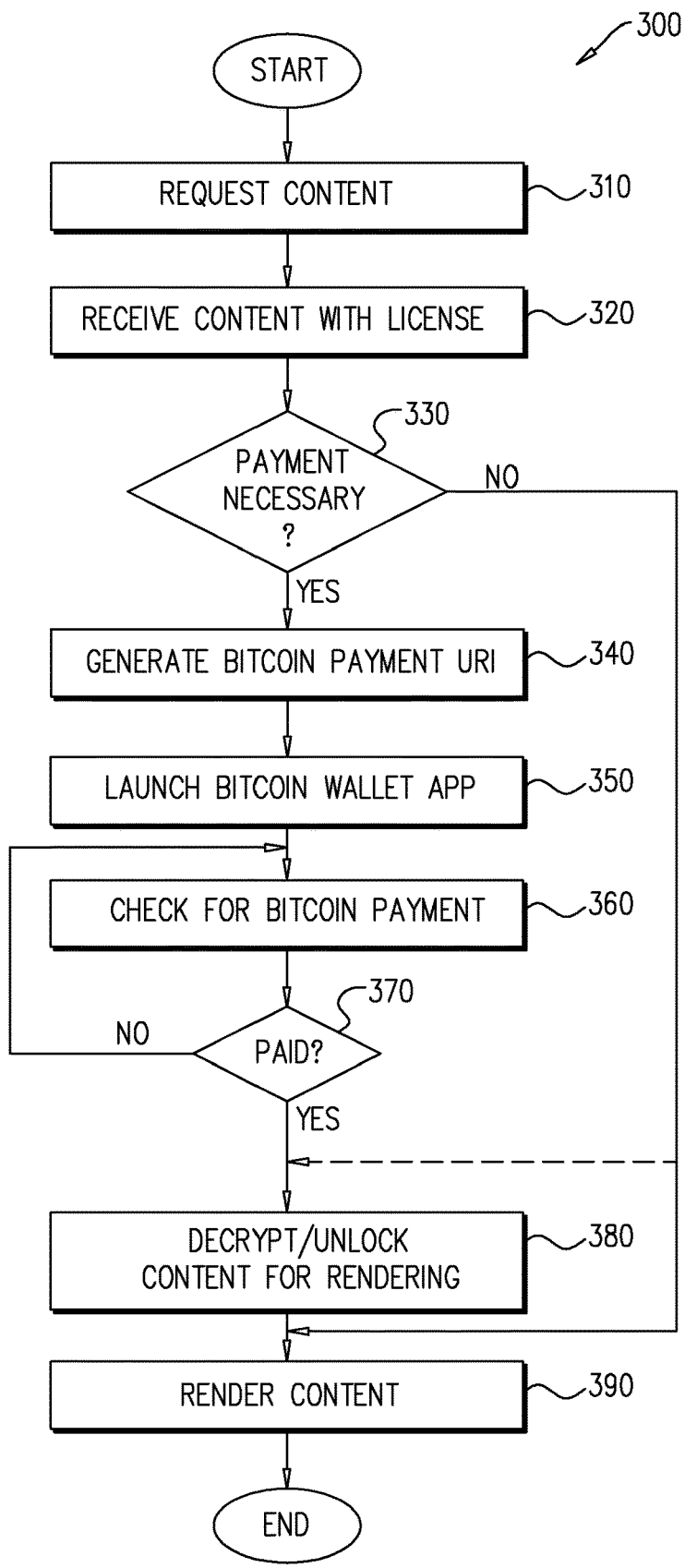
FIG. 4 is a flowchart of an exemplary rendering process to be performed by the digital content player device of FIG. 2.

Reference is now made to FIG. 4 which is a flowchart of an exemplary rendering process 300 to be performed on digital content player device 100. Digital content player device 100 may request (step 310) content 155 (FIG. 2) from ICN network 20 (FIG. 2). Such a request may be performed by media player 140 (FIG. 2), for example, in the context of playing a content playlist, where content 155 is one of the items in the content playlist. Alternatively, the content request may be performed via either a dedicated content request application (not shown) or a browser application (not shown). It will be appreciated that the request for content may be forwarded to ICN network 20 via I/O module 120.

I/O module 120 may receive (step 320) the requested content, i.e., content 155 as depicted in FIG. 2. It will be appreciated that as described hereinabove, content 155 may be encrypted and wrapped together with license details. The license details may be digitally signed and include suitable key derivation material that may be suitable for DRM client 150 to extract a key for decrypting an encrypted content 155 once the transaction is complete. In accordance with embodiments described herein, the key derivation material is encrypted with one or more keys available for access by the DRM client 150, either by pre-loading DRM client 150 with the one or more keys and/or using secure access methods such as are known in the art.

It will also be appreciated that steps 310 and 320 may be performed implicitly. For example, instead of specifically requesting and receiving content 155, content 155 may be preloaded on device 100, or loaded from a removable device without a specific request as in step 310.

It will be appreciated that some of the content to be played by media player 140 may be distributed freely. Additionally, in some embodiments, content 155 may have been previously paid for in a previous iteration of process 300. Accordingly, media player 140 may invoke secure DRM client application 150 to check the license details wrapped with content 155 to determine whether or not payment is necessary before viewing content 155 (step 330). If payment is not necessary, process control may proceed to step 390 where media player 140 may render content 155 as per methods known in the art.

In accordance with some embodiments, where payment has been provided in a previous iteration of process 300, content 155 may remain in an encrypted state. In such a case, process control may proceed to step 380 where secure DRM client application 150 may unlock or decrypt content 155 as described hereinbelow.

In accordance with some embodiments, where supported by the blockchain transaction service, the requested transaction amount may be zero. For example, a "null transaction" with a zero transaction amount may be used to by content publisher 200 to track access of free content. A null payment may be used by secure DRM client application 150 to track usage of content for which the license limits the number of times the content may be accessed. It will be appreciated that for the purpose of determining the outcome of step 330, if a null payment is necessary, the result of step 330 may be "true" such that process control may continue to step 340.

If, per step 330, payment is necessary, secure DRM client application 150 may generate (step 340) a Bitcoin uniform resource identifier (URI) that includes the price (i.e., requested transaction amount), publisher Bitcoin wallet ID, and a secure transaction ID. As will be described hereinbelow, secure DRM client application 150 may use the secure transaction ID to verify that content 155 has been properly paid for before use on device 100. Accordingly, the secure transaction ID is associated with both content 155 and device 100; for example, but not limited to, the secure transaction ID may be generated by hashing an internal secure device ID with the ICN name for content 155, and/or encrypting the internal secure device ID with the ICN name. In accordance with embodiments described herein, the secure transaction ID may be limited to a maximum of eighty bytes in order to comply with typical limitations on Bitcoin client applications.

Secure DRM client application 150 may launch (step 350) Bitcoin wallet 160 (FIG. 2) to provide payment for content 155 in Bitcoin network 30 (FIG. 1). Bitcoin wallet 160 may employ I/O module 120 (FIG. 2) to communicate with Bitcoin network 30 in order to complete the transaction as per the price, publisher Bitcoin wallet ID, and secure transaction ID in the URI generated in step 340. In accordance with embodiments described herein, the secure transaction ID may be included in the OP_RETURN section of the Bitcoin transaction to "color" the payment, to enable the completed transaction to be located in a Bitcoin public ledger.

Secure DRM client application 150 may employ I/O module 120 to check (step 360) whether or not the payment has been made in Bitcoin network 30. For example, secure DRM client application 150 may contact a trusted public bitcoin server that allows searching of a public Bitcoin transaction ledger. Alternatively, in some implementations device 100 may have a Bitcoin server implemented locally. In such a case, secure DRM client application 150 may perform step 360 by checking a local copy of the Bitcoin transaction ledger on device 100.

If, per step 360, payment has been made (step 370), secure DRM client application 150 may unlock and/or decrypt (step 380) content 155 using methods known in the art. It will be appreciated that secure DRM client application 150 may be provided by content publisher 200 (FIG. 1), such that secure DRM client application 150 may be configured with the means necessary for performing step 380. For example, secure DRM client application 150 may have access to private keys suitable for decrypting content 155 that has been encrypted with an associated public key. Alternatively, secure DRM client application 150 may have access to an asymmetric key suitable for decrypting encrypted content 155.

In accordance with some embodiments described herein, secure DRM client application 150 may be associated with a multiplicity of content publishers 200. For example, secure DRM client application 150 may serve as a client application for a DRM service that is used by multiple content publishers 200. It will be appreciated that some content publishers 200 may use more than one secure DRM client application 150.

It will be appreciated that the unlocked/decrypted version of content 155 may be encoded using methods known in the art. Media player 140 may render content 155 for viewing, including, as necessary, decoding encoded content.

It will be appreciated that the embodiments described herein may effectively separate payment from secure distribution, thereby enabling democratized paid content distribution with low barriers of entry and full security.

In a distributed network, such as an Information Centric Network, the embodiments described herein provide a mechanism for providing DRM secured access public Bitcoin ledgers, such that a user may simply and anonymously pay for content, thereby gaining immediate access to the content. This may be facilitated by marking a Bitcoin transaction with custom metadata (e.g., by using the OP_RETURN opcode to indicate payment for the content according to the secure transaction ID), thus binding the transaction to the device.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "encrypted", in all of its grammatical forms, is used throughout the present specification and claims to refer to any appropriate scrambling and/or encryption methods for scrambling and/or encrypting a data stream, and/or any other appropriate method for intending to make a data stream unintelligible except to an intended recipient thereof. Well known types of scrambling or encrypting include, but are not limited to DES, 3DES, and AES. Similarly, the term "decrypted" is used throughout the present specification and claims, in all its grammatical forms, to refer to the reverse of "scrambled" and "encrypted" in all their grammatical forms.

Pursuant to the above definitions, the term "encoded" and the term "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, it will be appreciated that the term "decrypted" on the one hand, and the terms "decoded" and "decompressed" on the other hand, are used to refer to different and exclusive types of processing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A computing device comprising:
a media player programmed to play a digital content item on a computing device;
a blockchain-based wallet application programmed to transfer a transaction amount to a publisher wallet ID via an associated blockchain-based transaction service;
a secure digital rights management (DRM) client application programmed to:
generate a secure transaction ID by the secure DRM client application by encrypting an internal device ID of the computing device using an information centric name (ICN) of the digital content item;
generate an uniform resource identifier (URI) comprising the transaction amount for the digital content item, the publisher wallet ID, and the secure transaction ID associated with both the digital content item and the publisher wallet ID, wherein the secure DRM client application is programmed to forward the URI to the blockchain-based wallet application, and wherein the blockchain-based wallet application is programmed to forward the URI to the associated blockchain-based transaction service when providing the transaction amount;
verify transfer of the transaction amount to the publisher wallet ID, wherein the secure DRM client application being programmed to verify transfer of the transaction amount comprises the secure DRM client application being programmed to perform a lookup for the URI in a public transaction ledger associated with the associated blockchain-based transaction service, and upon verifying transfer of the transaction amount to the publisher wallet ID, unlock a locked version of the digital content item; and a processor programmed to execute the media player, the blockchain-based wallet application, and the secure DRM client application.

2. The computing device of claim 1, further comprising:
the media player being programmed to download the locked version of the digital content item from an ICN network.

3. The computing device of claim 1, wherein:
the locked version of the digital content item is an encrypted version of the digital content item; and
the secure DRM client application is programmed to decrypt the encrypted version of the digital content item.

4. The computing device of claim 1, wherein:
the blockchain-based wallet application is a Bitcoin wallet application; and
the associated blockchain-based transaction service is a Bitcoin network.

5. The computing device of claim 1, wherein the secure DRM client application is programmed to verify the payment according to a check for the secure transaction ID in the public transaction ledger.

6. The computing device of claim 1, wherein the blockchain-based wallet application is programmed to forward the secure transaction ID to the associated blockchain-based transaction service in a Bitcoin OP_RETURN opcode.

7. The computing device of claim 1, wherein the secure DRM client application is associated with a content publisher of the digital content item.

8. The computing device of claim 7, wherein the secure DRM client application is associated with a DRM service providing DRM services to at least two content publishers, wherein the content publisher is one of the at least two content publishers.

9. The computing device of claim 1, further comprising a local transaction server with a copy of the public transaction ledger.

10. A method for rendering digital content, the method comprising:
receiving a digital content item;
determining that the digital content item is locked;
generating a secure transaction ID by encrypting an internal device ID of a computing device using an information centric name (ICN) of the digital content item;
generating, using a secure digital rights management (DRM) client application, an uniform resource identifier (URI) comprising a transaction amount for the digital content item, a publisher wallet ID, and the secure transaction ID associated with both the digital content item and the publisher wallet ID;
transferring, using the URI, the transaction amount to the publisher wallet ID associated with a publisher of the digital content item, wherein the secure DRM client application is programmed to forward the URI to a blockchain-based wallet application, wherein the blockchain-based wallet application is programmed to forward the URI to an associated blockchain-based transaction service when providing the transaction amount, and wherein the blockchain-based wallet application programmed to transfer the transaction amount to the publisher wallet ID via the associated blockchain-based transaction service;

verifying that the transaction amount was transferred to the publisher wallet ID, wherein verifying that the transaction amount was transferred comprises performing a lookup for the URI in a public transaction ledger associated with a blockchain-based transaction service; and upon verifying that the transaction amount was transferred to the publisher wallet ID based on an entry in the public transaction ledger, unlocking the digital content item.

11. The method of claim 10, further comprising:
downloading the digital content item from an ICN network.

12. The method of claim 10, wherein the blockchain-based transaction service is a Bitcoin network.

13. The method of claim 12, further comprising forwarding the secure transaction ID to the blockchain-based transaction service in a Bitcoin OP_RETURN opcode.

14. The method of claim 10, wherein verifying comprises accessing a local copy of the public transaction ledger on the computing device.

15. A non-transitory computer-readable medium that stores a set of instructions which when executed perform a method executed by the set of instructions comprising:
receiving a digital content item;
determining that the digital content item is locked;
generating a secure transaction ID by encrypting an internal device ID of a computing device using an information centric name (ICN) of the digital content item;
generating, using a secure digital rights management (DRM) client application a uniform resource identifier (URI) comprising a transaction amount for the digital content item, a publisher wallet ID, and the secure transaction ID associated with both the digital content item and the publisher wallet ID;
transferring, using the URI, a transaction amount to the publisher wallet ID associated with a publisher of the digital content item, wherein the secure DRM client application is programmed to forward the URI to a blockchain-based wallet application, wherein the blockchain-based wallet application is programmed to forward the URI to an associated blockchain-based transaction service when providing the transaction amount, and wherein the blockchain-based wallet application programmed to transfer the transaction amount to the publisher wallet ID via the associated blockchain-based transaction service;
verifying that the transaction amount was transferred to the publisher wallet ID, wherein verifying that the transaction amount was transferred comprises performing a lookup for the URI in a public transaction ledger associated with a blockchain-based transaction service; and
upon verifying that the requested transaction amount was transferred to the publisher wallet ID based on an entry in the public transaction ledger, unlocking the digital content item.

16. The non-transitory computer-readable medium of claim 15, wherein a locked version of the digital content item is an encrypted version of the digital content item, and wherein the secure DRM client application is programmed to decrypt the encrypted version of the digital content item.

17. The non-transitory computer-readable medium of claim 15, wherein the transaction amount is transferred using a blockchain-based wallet application which is a Bitcoin wallet application, and wherein the blockchain-based transaction service is a Bitcoin network.

18. The non-transitory computer-readable medium of claim 16, wherein the secure DRM client application is programmed to verify the payment according to a check for the secure transaction ID in the public transaction ledger.

19. The non-transitory computer-readable medium of claim 16, wherein the blockchain-based wallet application is programmed to forward the secure transaction ID to the blockchain-based transaction service in a Bitcoin OP_RETURN opcode.

20. The non-transitory computer-readable medium of claim 15, wherein the secure DRM client application is associated with a content publisher of the digital content item.

* * * * *